United States Patent [19]
Bochynsky

[11] 3,887,231
[45] June 3, 1975

[54] BACKREST FOR WHEELED VEHICLES
[75] Inventor: Frank J. Bochynsky, Highland Park, N.J.
[73] Assignee: The Byke Co., Highland Park, N.J.
[22] Filed: Jan. 28, 1974
[21] Appl. No.: 437,177

[52] U.S. Cl. ............ 297/366; 297/DIG. 9; 297/195
[51] Int. Cl. .............................................. A47c 3/00
[58] Field of Search ........... 297/356, 353, 354, 373, 297/195, DIG. 9, 366, 367; 248/242, 291, 240.4

[56] References Cited
UNITED STATES PATENTS

| 457,125 | 8/1891 | Liesenbein | 297/356 X |
| 1,033,156 | 7/1912 | Conroy | 297/DIG. 9 |
| 1,139,184 | 5/1915 | Johnson | 297/DIG. 9 |
| 1,380,934 | 7/1921 | Speer | 297/DIG. 9 |
| 3,484,831 | 6/1969 | Higuchi | 297/356 X |
| 3,822,917 | 7/1974 | George | 297/DIG. 9 |

FOREIGN PATENTS OR APPLICATIONS

| 1,038,878 | 8/1966 | United Kingdom | 297/356 |

*Primary Examiner*—James T. McCall
*Attorney, Agent, or Firm*—Robert A. Green

[57] ABSTRACT

The backrest of the invention comprises a cushion member secured to a portion of a ratchet mechanism such that, when the ratchet switch is set in one orientation, the backrest, operating like the handle of a ratchet wrench, can be pivoted upwardly and locked in place for use. When the ratchet switch is placed in the second orientation, the backrest can be rotated in the opposite direction out of contact with the driver.

4 Claims, 6 Drawing Figures 3,887,231

BACKREST FOR WHEELED VEHICLES

BACKGROUND OF THE INVENTION

The backrest of the invention is particularly suitable for use with motorcycles. At the present time, one or two types of backrest are available for use on motorcycles; however, these backrests all have drawbacks not found in the present invention. For one thing, one known type of backrest is permanently in place and cannot be conveniently removed to permit a passenger to ride behind the driver. There is no known backrest which is simple to operate, can be readily set in place or removed, can be used as a seat for a passenger, and provides comfort and a feeling of security.

SUMMARY OF THE INVENTION

Briefly, a backrest embodying the invention comprises a cushion assembly secured to a ratchet mechanism which itself is secured to a portion of a vehicle and which is used to move the cushion into and out of the desired operating position. The ratchet mechanism also serves to lock the cushion in the desired upright backrest position.

DESCRIPTION OF THE PREFERRED EMBODIMENTS

The backrest of the invention 10 is most suitable for use with motorcycles; however, it is useful with any type of wheeled vehicle where a backrest is needed for the driver or other rider. The backrest 10 can be secured to any part of the motorcycle; however, most motorcycles have a passenger security strap which lies across the seat and which is usually secured at its ends to bolts secured to the seat assembly on either side thereof. As an example, the backrest of this invention can be secured by these bolts or to the structure to which these bolts are secured.

Figure 1:
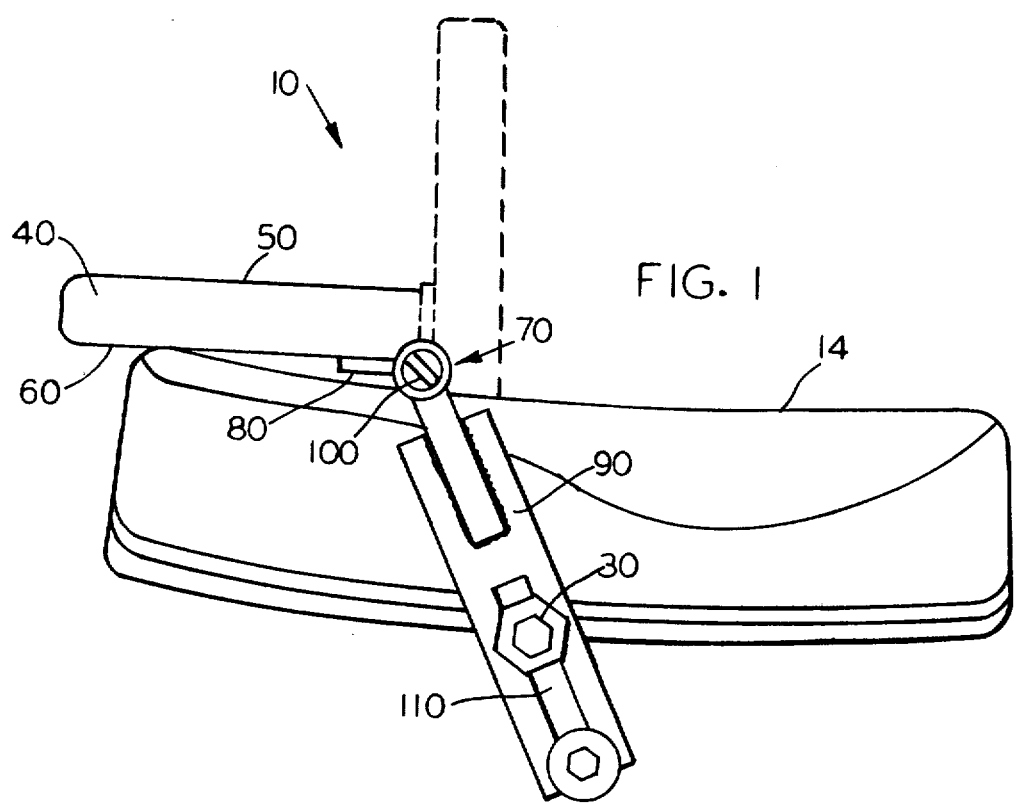
FIG. 1 is a side elevational view of a portion of a vehicle and a backrest assembly embodying the invention.
Figures 2, 3, 4:
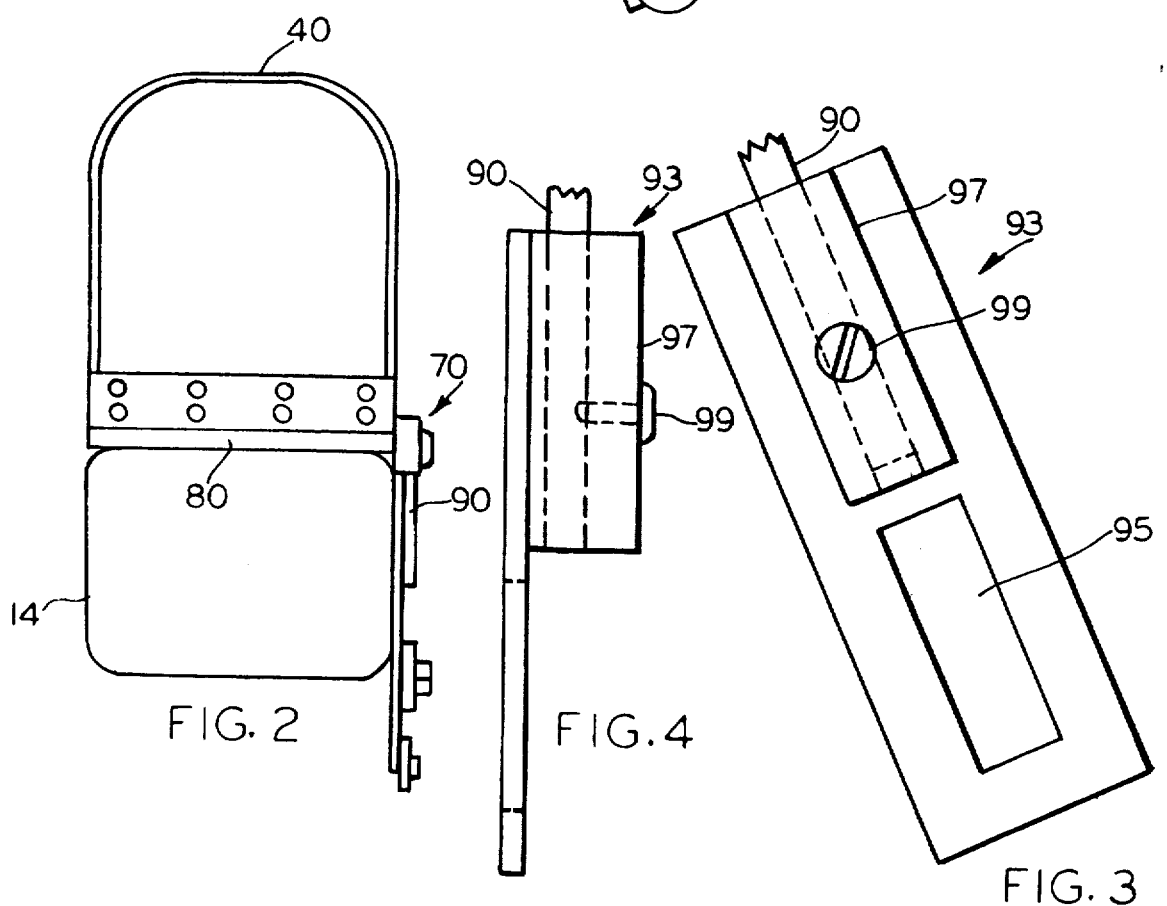
FIG. 2 is a rear view of the apparatus of FIG. 1.
FIG. 3 is a front elevational view of a modification of a portion of the invention.
FIG. 4 is a side elevational view of the apparatus of FIG. 3.

According to the invention and referring to FIGS. 1 and 2, the backrest 10 includes a cushion 40 which is preferably of such size and shape that it can be used as a seat as well as a backrest, and, for esthetic reasons, it is also identical to the seat cushion in appearance and structure. The backrest includes a front surface 50 and a rear surface 60. The apparatus of the invention includes a generally L-shaped ratchet mechanism 70 including a first horizontal portion 80 and a second vertical portion 90 which are rotatable and lockable with respect to each other by means of a mechanism of the type used in a conventional ratchet wrench. The usual ratchet switch 100 is provided for controlling the direction of rotation of the parts with respect to each other. Thus, the mechanism 70 may actually comprise a conventional ratchet wrench in which the handle forms vertical portion 90, and horizontal portion 80 is that portion which is usually coupled to and turns a nut or bolt or the like.

According to the invention, the horizontal portion 80 of the ratchet mechanism 70 may be welded to, or it itself may be shaped as, a flat plate which is bolted or otherwise secured to the rear surface 60 of the backrest cushion adjacent to the lower edge thereof. The plate 80 is preferably three or four inches wide and about as long as the seat is wide, to provide suitable strength and rigidity.

The vertical portion 90 of the ratchet mechanism 70 is also either welded to, or formed as, a flat plate having an opening or slot 110 (FIG. 1) into which bolt 30 is inserted to secure the ratchet mechanism to the seat assembly. The parts are designed and related so that the lower edge of the backrest cushion rests on the seat 20 when it is in a vertical position, as shown in dash lines in FIG. 1.

Of course, vertical portion 90, if of suitable size and shape, can be attached to any other portion of a motorcycle, such as the shock absorbers or the like.

A modification of the invention, shown in FIGS. 3 and 4, utilizes a bracket 93 having a slot 95, by which it is adjustably secured to the motorcycle. The slot 95 occupies the lower portion of the bracket, and the upper portion of the bracket is provided with a tubular holder 97 in which the vertical portion or handle 90 of the ratchet mechanism 70 can be inserted and locked in place by a bolt 99 or the like. It can be seen that the vertical position of the handle 90, and thus the vertical position of the backrest, can be adjusted by the position of the handle in the tubular holder 97.

In operation of the backrest of the invention 10, if the backrest 10 is flat and it is desired to raise it into operating position, the ratchet switch 100 is set to the proper position for such operation and the backrest cushion is rotated to raise it to its vertical orientation in which it is locked in place by the ratchet mechanism. If later, it is desired to lower the backrest, the ratchet switch 100 is reversed and the seat is rotated to its lowered position by operating the ratchet mechanism in the usual fashion. In the lowered position, the backrest cushion 40 can be used as a seat for a passenger.

Figure 5:
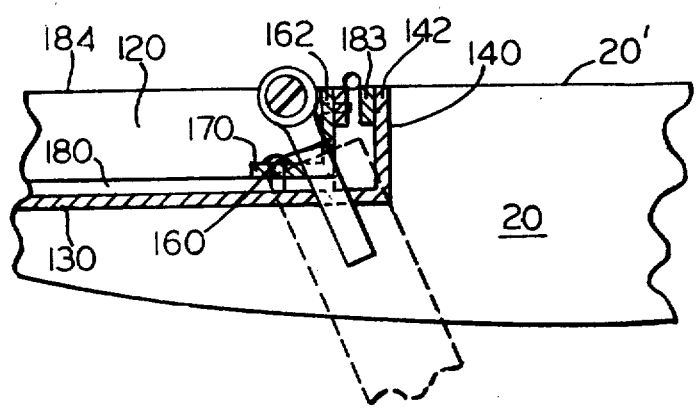
FIG. 5 is a side elevational view of a portion of a vehicle seat illustrating a modification of the invention.
Figure 6:
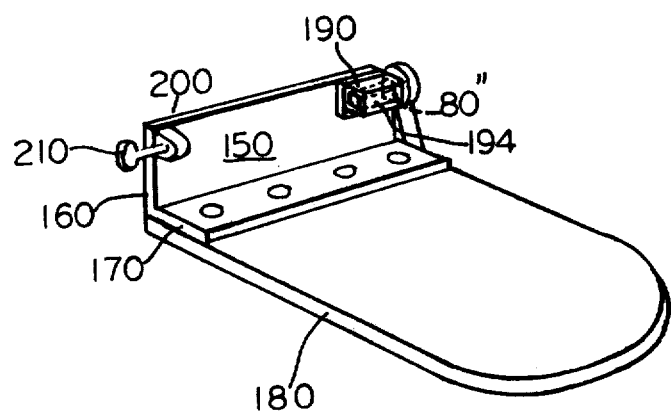
FIG. 6 is a perspective view of a portion of the apparatus of FIG. 5.

In a modification of the invention illustrated in FIGS. 5 and 6, the motorcycle seat 20, rearwardly of the driver's seat portion 20', is provided with a cutout portion 120, generally of the size and shape of the backrest, to expose the horizontal base 130 on which the seat is constructed. This base may be of wood or metal or the like. The cutout portion includes a vertical front wall 140, also of metal or wood, and integral with or secured to the base 130 and defining the forward position of the cutout portion immediately behind the driver's seat portion 20'.

In this modification of the invention, the backrest assembly comprises an L-shaped bracket 150 including a vertical portion 160 and a horizontal portion 170. A plate 180 of wood or metal of sufficient area to carry the backrest cushion is secured to the horizontal portion 170 of the bracket 150 and the upper edge 162 of the vertical portion 160 of the backrest is pivotally secured to the upper edge 142 of the vertical wall 140 of the cutout portion of the seat by means of one or more suitable hinges 183.

The vertical wall 160 of bracket 150 carries, adjacent or along its upper edge and at the right-hand end, as seen in in FIG. 5, a plate 190 including a rectangular socket 194 which is adapted to receive the rectangular post or stud 80' which is usually found on a ratchet wrench and which comprises the horizontal portion thereof in this embodiment of the invention, rather than horizontal portion 80 shown in FIGS. 1 and 2. The vertical wall 160 is also provided at its opposite end with a tubular bracket plate 200 which is adapted to receive a locking pin 210. The backrest cushion 184 (FIG. 4) is carried by the plate 180, and the cushion is of such thickness that it is level with the driver's cushion and can comfortably serve as a seat for a passenger.

In using this modification of the invention, the assembly of L-shaped bracket 150 and cushion is set in place in the cutout portion of the seat, and the plate 190 is slipped onto the stud 80' of the ratchet mechanism, which is already in place, and the locking pin 210 is inserted in the bracket. The assembly is thus locked in place and ready for use in the manner described above.

Of course, the ratchet mechanism structure shown in FIGS. 1 and 2 could also be used in this modification of the invention, and, in this case, the horizontal portion 80 of the ratchet mechanism would be secured directly to vertical wall 160 of L-shaped bracket 150. It is also to be understood that other modifications could be made in the specific structures described within the scope of the invention.

What is claimed is:

1. A bracket structure for a vehicle, said vehicle including a frame and a seat for the driver.

said structure comprising a bracket secured to said frame on one side of the driver's seat, a ratchet wrench comprising a handle, a rotatable shaft, and a switch for operating said wrench to permit said shaft to rotate clockwise or counterclockwise, said handle of said ratchet wrench being disposed adjacent to the driver's seat and secured to said bracket, said rotatable shaft being disposed parallel to said seat, and a backrest secured to said rotatable shaft and disposed rearwardly of said driver's seat in position to bear against the back of the driver.

operation of said switch permitting said shaft to rotate and to move said backrest into and out of operative relation with the motorcycle driver sitting on said seat.

2. The apparatus defined in claim 1 wherein said bracket carries a tube and said handle of said ratchet wrench is slidably and adjustably disposed within said tube and said tube carries means for locking said handle in place therein.

3. The apparatus defined in claim 1 wherein said seat includes a cutout portion rearwardly of the portion thereof on which the driver of the vehicle sits, said backrest assembly being seated within said cutout portion so that the cushion thereof has its top surface coplanar with the top surface of said seat.

4. The apparatus defined in claim 3 wherein said cutout portion includes a front wall and said backrest assembly is pivotally secured to said front wall.

* * * * *